United States Patent [19]
Dai

[11] Patent Number: 5,822,877
[45] Date of Patent: Oct. 20, 1998

[54] MULTI-PROBE SYSTEM FOR DIMENSIONAL METROLOGY

[75] Inventor: YuZhong Dai, Coventry, R.I.

[73] Assignee: Brown & Sharpe Manufacturing Company, Kingstown, R.I.

[21] Appl. No.: 670,176

[22] Filed: Jun. 20, 1996

[51] Int. Cl.[6] .................................................. G01B 7/03
[52] U.S. Cl. ............................................. 33/560; 33/557
[58] Field of Search ........................... 33/1 M, 503, 551, 33/552, 553, 554, 556, 557, 559, 560, 561, 561.1

[56] References Cited

U.S. PATENT DOCUMENTS

| | | |
|---|---|---|
| 2,909,842 | 10/1959 | Aller .......................................... 33/557 |
| 3,325,903 | 6/1967 | Zurlinden .................................. 33/557 |
| 3,869,799 | 3/1975 | Neuer et al. . | 
| 4,136,458 | 1/1979 | Bell et al. . |
| 4,153,998 | 5/1979 | McMurty . |
| 4,221,053 | 9/1980 | Bobel, II et al. ......................... 33/552 |
| 4,785,545 | 11/1988 | Aubele ..................................... 33/557 |
| 4,972,594 | 11/1990 | Gurny et al. ............................. 33/561 |
| 4,978,857 | 12/1990 | Juengel .................................... 33/561 |
| 5,014,440 | 5/1991 | Lessi et al. .............................. 33/557 |
| 5,526,576 | 6/1996 | Fuchs et al. ............................. 33/556 |

FOREIGN PATENT DOCUMENTS 1 447 613   8/1976   United Kingdom .

Primary Examiner—G. Bradley Bennett
Attorney, Agent, or Firm—Wolf, Greenfield & Sacks, P.C.

[57] ABSTRACT

A multi-probe system for dimensional metrology. This system utilizes a probe base that is attachable to a coordinate measuring machine and that includes a plurality of probes mounted at spaced-apart locations on the base. The probes are interconnected with the coordinate measuring machine and generate measurement signals based upon interaction with a workpiece. By providing a plurality of probes on a single assembly, multiple measurements can be made on a workpiece in a single measurement cycle.

26 Claims, 9 Drawing Sheets

MULTI-PROBE SYSTEM FOR DIMENSIONAL METROLOGY

FIELD OF THE INVENTION

This invention relates to coordinate measuring machines and more particularly to a probe system for coordinate measuring machines.

BACKGROUND OF THE INVENTION

Electrically triggered probes are commonly used in conjunction with coordinate measuring machines for determining the location of points on a workpiece and thus the shape and dimensions of a workpiece. A probe, such as a touch trigger probe, is typically mounted at the end of an element movable along three orthogonal axes of a coordinate measuring machine. The probe is moved about the workpiece either manually, or commonly, under the control of the machine. As the stylus of the probe touches a point on the workpiece, the probe transmits a signal that is used to read the location of the point in each of the axes of the coordinate measuring machine. In this manner, the coordinates of a given point on a workpiece can be stored.

An early touch trigger probe is described in UK Patent Number 1447613 published on Aug. 25, 1976, and in U.S. Pat. Nos. 4,153,998 and 4.270,275 issued May 15, 1979 and Jun. 2, 1981, respectively, to David R. McMurtry. This early touch trigger probe uses the change in electrical resistance caused by a break in the circuit, resulting from contact between the probe stylus and an object, to generate its signal. When a probe contacts an object, it is typically designed to displace at an angle relative to its base, causing the signal to be generated. Other contact-sensing probes use piezoelectric sensors, optical sensors, capacitance and induction-based sensors. A three-dimensional continuous probe with multiple styli is described in U.S. Pat. No. 3,869,799 (Neuer). A probe with an elbowed stylus supporting two contact balls is described in U.S. Pat. No. 4,136,458.

Each of these prior art probes has been limited to the generation of only one signal on contact between the stylus of the probe and an object. Hence, only one point can be measured during a single machine motion cycle. Since the cycle typically comprises three steps, approaching an object, probing the object, and retrieving or retracting from the object, the measuring process using such a single signal probe is limited in speed.

Previous attempts to increase the speed of measurement have been employed using a so-called scanning probe, available, for example, from Leitz-Brown & Sharpe GmbH and Renishaw Electrical Ltd. Such a probe attempts to scan the surface of an object to achieve a higher data density. However, use and accuracy of these probes are limited due to the potential of a collision with an abrupt surface and due to stylus vibration as the probe moves along the surface. Speed is still a limiting factor and certain objects do not lend themselves to this type of probe. Optical scanning probes, using, for example, lasers, are also limited in use since such probes rely upon a proper surface finish and reflectivity. In addition, these probes are bulky and expensive.

Another existing system which uses multiple LVDT's for measuring forged parts is sold by Moore—Vernon of Hertfordshire England. However, this system can only measure one dimension of a workpiece at a time, as the probes are triggered only by probe movement parallel to the direction of motion of the probe assembly.

None of the foregoing prior art probes is capable of accurately measuring rapidly changing geometries on a workpiece, such as the leading and tracking edges of an air foil with small radii.

It is, therefore, an object of this invention to provide a probe that gives a higher throughput of measurement data for an object.

Another object of this invention is to provide a probe adaptable to a variety of object surfaces and shapes.

A further object of this invention is to provide a probe that measures with a high degree of accuracy and is capable of measuring in three dimensions.

Another further object of this invention is to provide a probe which is adaptable for use with existing coordinate measuring machines.

SUMMARY OF THE INVENTION

These and other objects are achieved in accordance with the present invention which relates to a probe assembly for a coordinate measuring machine which includes a plurality of individual probes mounted in spaced-apart relation on a base. The base, in turn, is attached to a movable element of the coordinate measuring machine which typically moves along three orthogonal axes. Each of the probes generates a discrete sensing signal based upon its position relative to an object to be measured so that a plurality of points on a workpiece are measured during one machine motion cycle.

Typically, the probes are arranged on the base in an alignment which approximates the contour of the surface to be measured. In one embodiment, each probe is individually adjustable, either manually or through the use of servo motors, in a direction generally transverse to the surface to be measured. In another embodiment, the probes may be automatically or manually adjusted in a direction parallel to their direction of elongation or parallel to the direction of projection of the probe from the base. In a further embodiment, each probe is pivotally mounted, and may be pivoted into a direction generally normal to the surface to be measured. In a further embodiment, a plurality of probes may be pivotally mounted to one base assembly. In another further embodiment, the probe base may be mounted on an articulating wrist assembly which both rotates about an axis and pivots at an angle with respect to that axis. In another embodiment for specialized applications, the base may be rotatable about a central axis of rotation, and each of the probes is aligned generally parallel with that axis. The probes may be retracted toward and away from the workpiece and rotated to provide the desired measurements.

In other embodiments of the invention, the workpiece may be mounted on a rotatable turntable to present different aspects of the workpiece to the probe. Noncontact probes are also within the scope of this invention and include optical or radar type probes which do not make physical contact with a workpiece.

In each of the probe assemblies described hereinabove having multiple probes, each of the probes themselves may have multiple styli to permit sensing by moving the base in multiple directions. While touch trigger probes are preferred, any other type of probe may be used for the contact type-probes described herein.

The probe assembly of this invention provides a higher throughput of measurement data for an object, since multiple measurements may be taken along a workpiece during one machine motion cycle. The probe assembly of this invention is highly accurate, even where geometries change rapidly, and is capable of measuring in three dimensions. Moreover, the probe assembly of this invention is adjustable to permit it to accommodate workpieces of different sizes and configurations. Finally, this probe assembly can be used with existing coordinate measuring machines.

BRIEF DESCRIPTION OF THE DRAWINGS

The objects, advantages and features of the invention will be more clearly appreciated from the following detailed description, when taken in conjunction with the accompanying drawings, in which.

DETAILED DESCRIPTION

Figure 1:
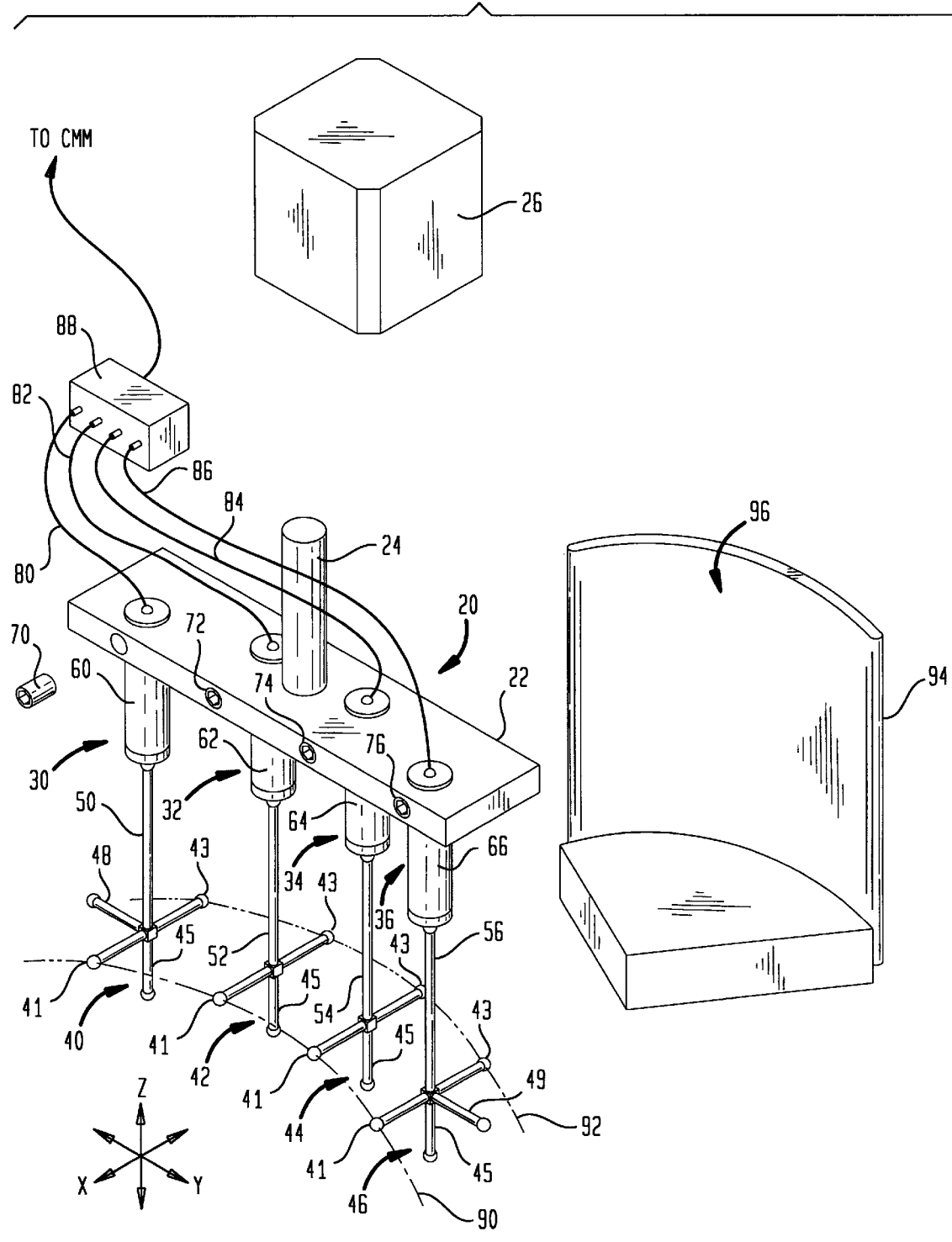
FIG. 1 is a partially exploded, perspective view of a probe assembly and object to be measured according to one embodiment of this invention.

A probe assembly 20 according to one embodiment of this invention is detailed in FIG. 1. Probe assembly 20 includes a base 22 and a stem 24. Stem 24 is adapted to engage an end 26 of an element of a coordinate measuring machine (CMM) (not shown) which is adapted to be moved along three orthogonal axes. A variety of CMM's can be adapted to utilize probe assembly 20 according to this invention. A typical system is a three-axis CMM in which probe assembly 20 is mounted to a z-axis rail or ram which moves vertically relative to a base (not shown) of the CMM. Examples of typical CMM's with which the probe assembly of this invention could be used include the MICROVAL® PFX, the X CEL® and PCR manufactured by Brown & Sharpe Manufacturing Co., of North Kingstown, R.I. and the PMM & SIRIO manufactured by Leitz-Brown & Sharpe GmbH of Wetzlar, Germany.

Stem 24 can be secured to end 26 with a variety of attachment mechanisms, such as a bayonet lock, set screws, chuck-jaws or any other acceptable locking mechanism. In the illustrated embodiment of FIG. 1, end 26, in conjunction with other elements (not shown) can drive probe assembly 20 in each of three orthogonal axis direction, the x-axis, the y-axis, and the z-axis, as shown by the respective arrows in FIG. 1.

Probe base 22 contains four individual probes 30, 32, 34 and 36 according to this embodiment. Each of probes 30, 32, 34 and 36 includes a respective stylus assembly 40, 42, 44 and 46. Each stylus assembly 40, 42, 44 and 46 is disposed at the end of a stem 50, 52, 54 and 56, respectively. Each stylus assembly 40, 42, 44 and 46 is composed of individual styli that project in a plurality of orthogonal directions. Each assembly 40, 42, 44 and 46 preferably includes two opposed styli 41 and 43 extending in the x-axis direction and one stylus 45 extending in the z-axis direction. The end styli 40 and 46 also preferably include opposing, outwardly projecting styli 48 and 49, respectively, both of which extend in one axis direction, preferably the y-axis. The length of the stems and styli are variable, and are based upon certain characteristics of the object to be measured, including its size and shape. For large scale measurements, probe stems are typically about one-eighth of an inch in diameter and three to five inches in length overall, including styli 45. Other styli can be approximately one-and-one-half inches in length. However, styli as small as one-half inch or less in length and having appropriately-sized probe stems can be provided. Likewise, larger probe stems and styli are also contemplated.

Figure 11:
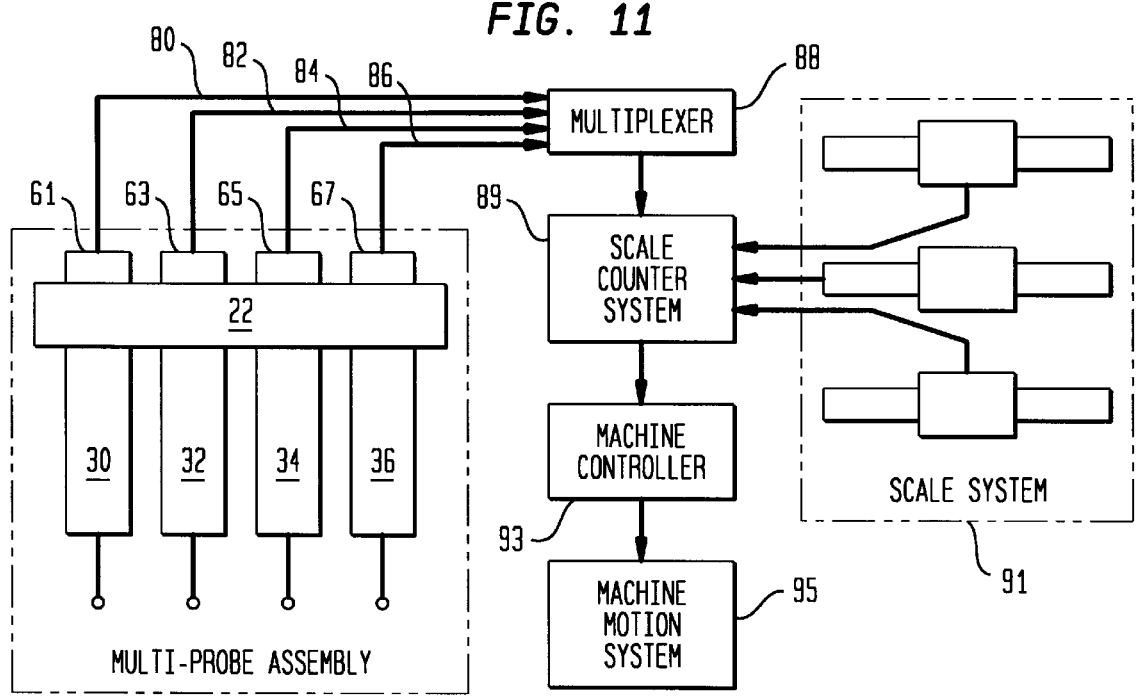
FIG. 11 is an electrical schematic diagram illustrating the steps of processing the probe signals in a CMM.

Probes 30, 32, 34 and 36 each include probe bodies 60, 62, 64 and 66, respectively, which include respective contacts 61, 63, 65 and 67 within the bodies (FIG. 11). These contacts 61, 63, 65 and 67 respond to contact between the styli and object in either the x or y-axis directions. In particular, stems 50, 52, 54 and 56 are permitted to pivot within a predetermined arc about base 22 in each of the x and y-axis directions, or in a combination of the x and y axis directions as styli engage a workpiece. In addition, contacts 61, 63, 65 and 67 may be provided with known sensors to detect contact with a workpiece in the z-axis direction. Each of the contacts 61, 63, 65 and 67 can operate as a simple on-off switch to detect a hit or can include a variable resistance, inductance, or capacitance circuit, or optical means that outputs a variable current or voltage in response to a given displacement of a probe. Likewise, a series of distance transmitters (not shown) can report movement in each of a plurality of different directions. Probes 60, 62, 64, and 66 are mounted to probe base 22 within recesses and are preferably secured by set screws 70, 72, 74 and 76, respectively, or by other known means which enable probes 60, 62, 64 and 66 to be moved (x and y-axis directions) and adjusted upwardly and downwardly (z-axis direction) relative to probe base 22.

Each of probes 62, 64 and 66, and their corresponding contacts 63, 65 and 67 may have the same configuration as that of probe 60 and its associated contact 61. The preferred configuration is that illustrated in U.S. Patent No. 4,153,998. However, it is to be understood that other configurations are also acceptable and are within the scope of the present invention. Such other configurations are also found in U.S. Pat. No. 4,270,275, U.S. Pat. No. 4,136,458 and British Patent No. 1,447,613. Other known probes which would be acceptable include an optical probe manufactured by Cyberoptics, vision probes, and 3-D analog probes manufactured by Brown & Sharpe Manufacturing Company. It is also to be understood that the foregoing probes, as well as probe 60 and its associated contact 61, as illustrated in FIGS. 12–14, may be used with each of the other probe configurations hereinafter described in this application.

Figure 12:
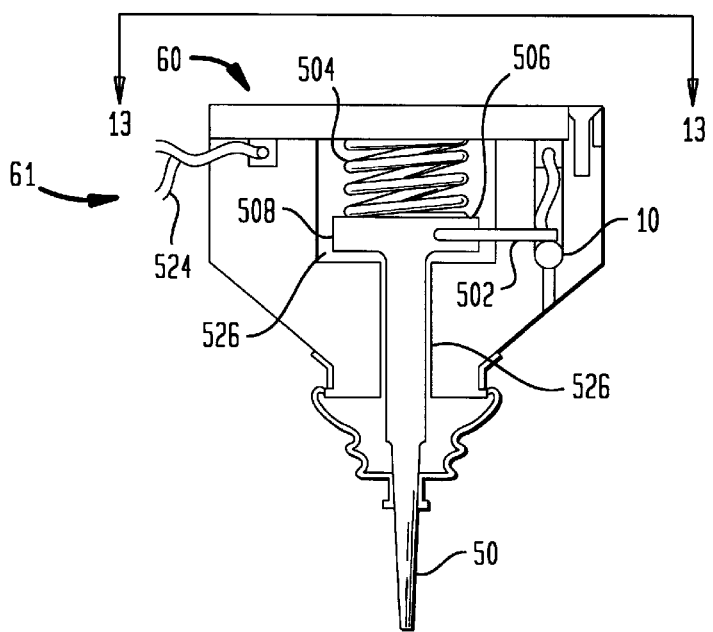
FIG. 12 is a cross-sectional, elevation view of an exemplary probe to be used in accordance with the present invention.
Figure 13:
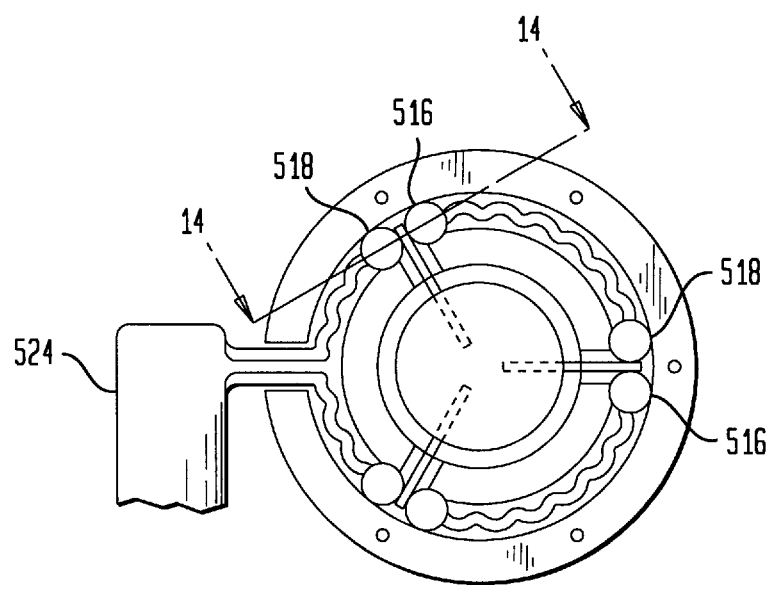
FIG. 13 is a cross-sectional view of the probe of FIG. 12 taken along the line 13—13.
Figure 14:
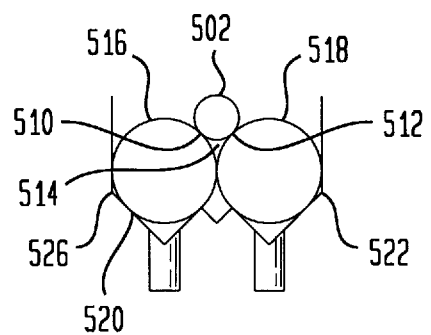
FIG. 14 is a cross-sectional view taken along the line 14—14 of FIG. 13.

Referring now to FIGS. 12–14, an exemplary probe 60 and its associated contact 61 will be described. It is to be understood that like numbers are used in FIGS. 12–14 for like parts in FIG. 1. Contact 61 includes three members or elements 502 which extend radially outwardly from stem 50. Stem 50 is urged by a spring 504 acting on top 506 of the stem 50 toward a defined rest position relative to the probe housing. In this defined rest position, each element 502 engages both sides 510 and 512 of a respective V-shaped slot 514. The V-shaped slots 514 are formed by each pair of ball bearings 516 and 518 which sit in respective drillings 520 and 522. Ball bearings 516 and 518 form convergent surfaces 510 and 512 which assure that elements 502 are seated between the bearings such that in the rest position, all three elements 502 make contact substantially with their respective ball bearings 516 and 518.

In operation, contact between any one of the styli of assembly 40 and an object to be measured deflects stem 50 away from its rest position against the force of spring 504. Stem 50 thus assumes a different orientation relative to the housing while deflected. The deflection is detected by providing an electric circuit 524 which is normally completed when stem 50 is in its rest position. Each ball bearing 516 and 518 is electrically insulated from the housing, and from the other ball in the pair by insulation 526. The circuit path passes in series from one V-shaped slot 514 to the next adjacent one, and each element 502, which is insulated from the stem and from the other elements 502, completes the circuit between the two sides of each respective V-shaped slot. Deflection of stem 50 away from its defined rest position results in at least one of the elements 502 breaking contact with at least one of the sides of one of the respective V-shaped slots, thus breaking the circuit 524. The breaking of the circuit is used to provide an output signal from contact 61, as will be described.

A clearance 526 is provided between stem 50 and the housing, and this clearance allows limited deflection of stem 50 within the housing. Any deflection of the stem away from the defined rest position is resiliently opposed by compression of spring 504. Thus, damage to stem 50 due to the inertia of the probe during measurement may be avoided.

In this embodiment a series of wires 80, 82, 84 and 86 interconnect signals from each of contacts 61, 63, 65 and 67, respectively, to the CMM. A known signal conditioning or multiplexing device 88 can be provided in line between wires 80, 82, 84 and 86 and the CMM to create an overall output of all probes that is usable by the CMM. Device 88 also can be used to adapt the multi-probe signal for use by a CMM that is ordinarily programmed to receive only one probe signal. While wires 80, 82, 84 and 86 and an external device 88 are preferred, any acceptable form of integral or exposed conduit and circuitry, including software processing systems, would be within the scope of this invention. In one embodiment, as shown in FIG. 11, device 88 delivers a different value output for each different grouping of probes which are activated. In the embodiment of FIG. 11, as each of contacts 61, 63, 65 and 67 generates a signal in response to a hit by its respective probe 30, 32, 34 and 36, a signal is sent to the device 88 along respective wires 80, 82, 84 and 86. Device 88 samples each of these signal paths in some predetermined manner, and provides a single signal at any one time to the scale counter system 89 of the CMM which is reflective of a hit by one or more of probes 30, 32 and 34 and 36. The scale counter system 89 reads the scale system 91 of the CMM and indicates the scale readings at the instant contact is made by any one probe. The scale system 91 of the CMM includes one scale for each of the x-axis, y-axis and z-axis directions and moves with the machine components. For each probe contact, a signal is sent from scale counter system 89 to the machine controller 93 which reflects the scale readings in the x-axis, y-axis and z-axis directions for that particular probe at the time the hit was registered. This data is used and stored by the machine controller 93 to provide the analysis desired by the operator of the CMM. Moreover, a signal is sent to the machine control system 95 in response to the signals received from scale counter system 89 and control system 95 then produces desired motion of the probe assembly and the scale system 91. Typically, after a reading is taken, the assembly is moved to the next preprogrammed location on the workpiece, and the scale system 91 is moved accordingly.

Typically, the four probes 30, 32, 34 and 36 are mounted on base 22 along a path in which the orientation of the probes generally conforms to the shape of the surface to be measured. One example of a path is an arcuate path, as shown by dashed lines 90 and 92. However, a variety of other orientations are contemplated. An arcuate orientation is chosen in this embodiment since the orientation matches the profile of the object to be measured, workpiece 94. The probe array in this embodiment extends over virtually the entire arcuate surface 96 of workpiece 94. Hence, by executing a single alignment motion in the y and z axis directions to place the probes before workpiece 94, and by executing a corresponding movement toward and away from arcuate surface 96, a measurement of four points on surface 96 can be accomplished in one motion cycle. A prior art probe would require four individual machine cycles to gather the same amount of data for surface 96. The CMM, or even the probes themselves, may include a known over-travel protection mechanism (not shown) to prevent probes 30, 32, 34 and 36 from being broken or damaged if assembly 20 is misaligned, or if surface 96 is not properly aligned or is not shaped as expected.

In operation, probe assembly 20 is driven into a confronting position with respect to surface 96. Since the probe orientation nominally matches the contour of surface 96, probes 30, 32, 34 and 36 will all be triggered at approximately the same time. The signals received from contacts 61, 63, 65 and 67 are then processed in the manner described above with respect to FIG. 11. In a typical application of probe assembly 20, the scale readings for each probe at the time it is triggered provide some indication of the deviation from standard of the workpiece being measured. Other factors in the CMM must be included in the error calculation, including the deviation of the probe orientation from the standard contour for surface 96. Typically, these other factors are known or can be measured, and can be incorporated into the calculation of the deviation of the workpiece from a standard using suitable software.

Figure 2:
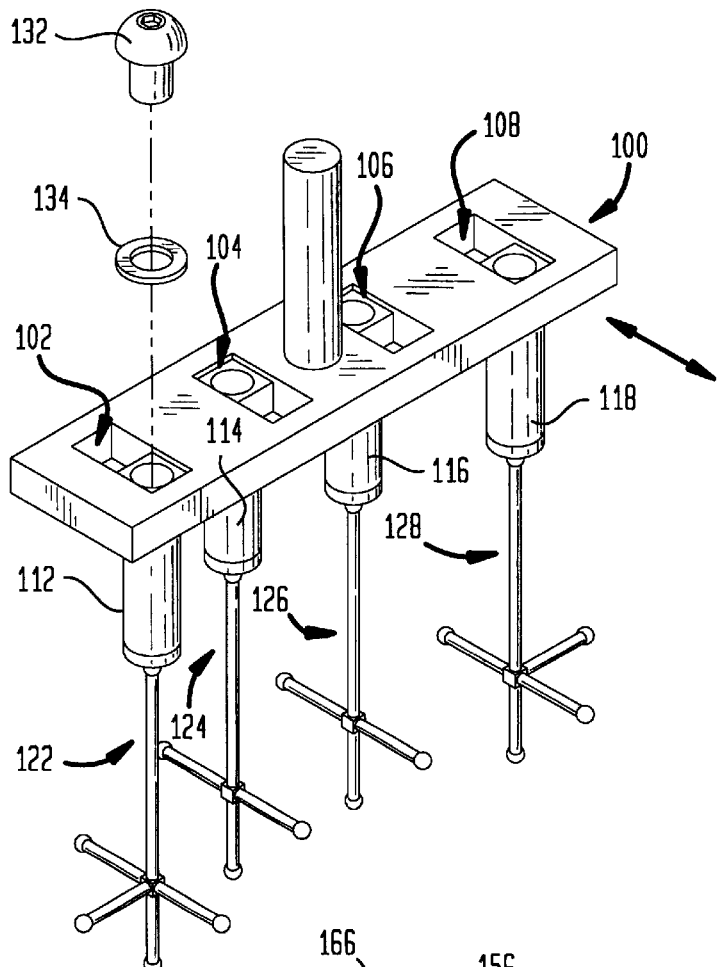
FIG. 2 is a schematic, exploded, perspective view of the probe assembly of FIG. 1 illustrating an adjustment mechanism according to one embodiment of this invention.

Another embodiment is illustrated in FIG. 2. It is contemplated that the alignment of probes in an assembly according to this invention should be adaptable to different surface contours to ensure that the probe assembly displays versatility. For this purpose, in a further embodiment of this invention, probe base 100 includes a series of slots 102, 104, 106 and 108 that slidably receive an upper portion of probe bodies 112, 114, 116 and 118 of probes 122, 124, 126 and 128, respectively. The upper portions contain contacts as described with respect to FIGS. 1, and 12–14, but which are not illustrated herein for convenience. The signals from these probes may be processed as described in FIG. 11. Slots 102, 104, 106 and 108 extend generally in a transverse direction D, which is transverse to the direction of elongation of base 100, or transverse to a line connecting each slot 102, 104, 106 and 108, or, in one embodiment, generally transverse of the surface to be measured. A set screw such as set screw 132 and washer 134 are provided to secure each of probe bodies 112, 114, 116 and 118 in a given, slidably positioned location relative to probe base 100. In this manner probes 122, 124, 126 and 128 can be aligned in a variety of contours. It should be noted that probe base 100 or any of the probe bases provided herein can be formed into any non-planar shape and into any non-rectangular shape. In other words, probe base 100 can be formed, for example, as a crescent or an arch so that its robes have a more pronounced surface contour.

Figure 3:
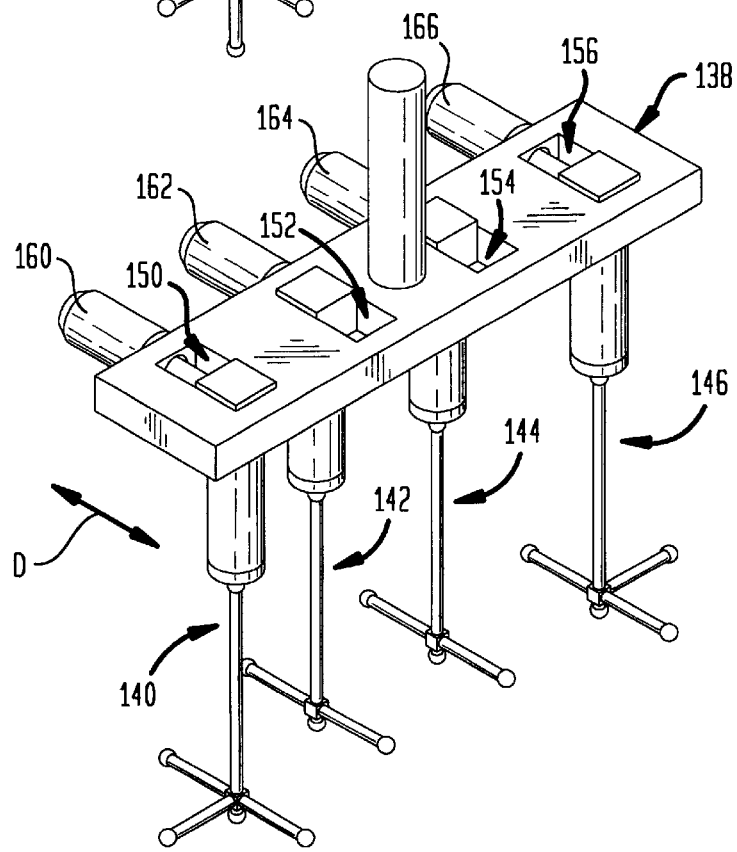
FIG. 3 is a schematic, perspective view of a probe assembly according to another embodiment of this invention illustrating an automated adjustment mechanism.

A further embodiment of the probe base is illustrated in FIG. 3. A probe base 138 supports probes 140, 142, 144 and 146 in respective slots 150, 152, 154 and 156 in communication with drive motors 160, 162, 164 and 166, respectively. Probes 140, 142, 144 and 146 each contain a contact (not shown) which may be similar to that described for the embodiment of FIGS. 1, and 12–14. The signals from these probes may be processed as described in FIG. 11. Drive motors 160, 162, 164 and 166 automatically move probes 140, 142, 144 and 146 in a transverse direction D (as defined above) in the slots within a predetermined range of movement. In one embodiment, motors 160, 162, 164 and 166 comprise linear motors or rotary motors using a screw drive. An optional separate control (not shown) can be provided to independently power each of motors 160, 162, 164 and 166. Motors 160, 162, 164 and 166 may be powered by an automatic system that brings probes 140, 142, 144 and 146 into a proper alignment as the probes are brought into contact with a reference workpiece from which calibration measurements are taken. In one embodiment, probe base 138 is brought into contact with a reference workpiece (not shown) and as probes are triggered, non-triggered probes are moved forwardly toward the workpiece until they are also triggered, so that all probes are aligned in a contour that nominally matches the shape of the workpiece to be measured.

Figure 4:
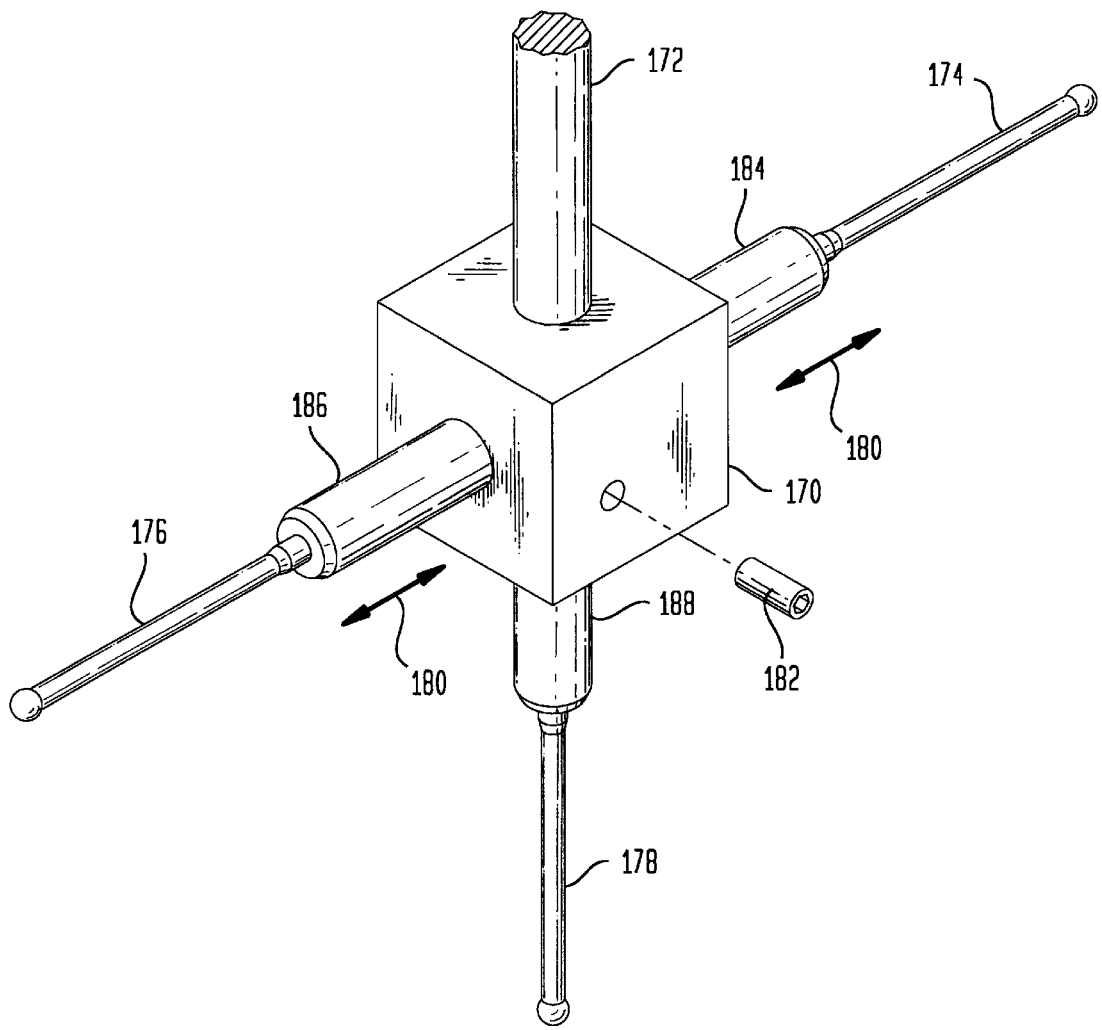
FIG. 4 is a schematic, perspective view of a stylus grouping for use with the probe assembly according to this invention, illustrating adjustable styli.

FIG. 4 illustrates one embodiment of a stylus holder 170 according to this invention. Stylus holder 170 is mounted on a stem 172 and receives three styli, two y-axis styli 174 and 176 and a z-axis stylus 178. Each stylus 114, 176 and 178 contains a contact (not shown) which may be similar to that described in the embodiment of FIGS. 1, and 12–14. The signals from these probes may be processed as described in FIG. 11. In this embodiment, opposing styli 174 and 176 can be adjusted toward and away from holder 170, as shown by arrows 180. Styli 174 and 176 may be secured by set screw 182. The z-axis stylus 178 is also movable according to an alternate embodiment and is secured by a similar set screw. Using appropriately sized motors or actuators (not shown), the styli can be moved automatically relative to holder 170. Holder 170 contains probe bodies 184, 186 and 188. Holder 170 can be provided as one probe on a larger multiple probe assembly as described herein. Alternatively, holder 170 itself may comprise a multiple-probe arrangement that also can be mounted directly to an element of a CMM via stem 172.

Figure 5:
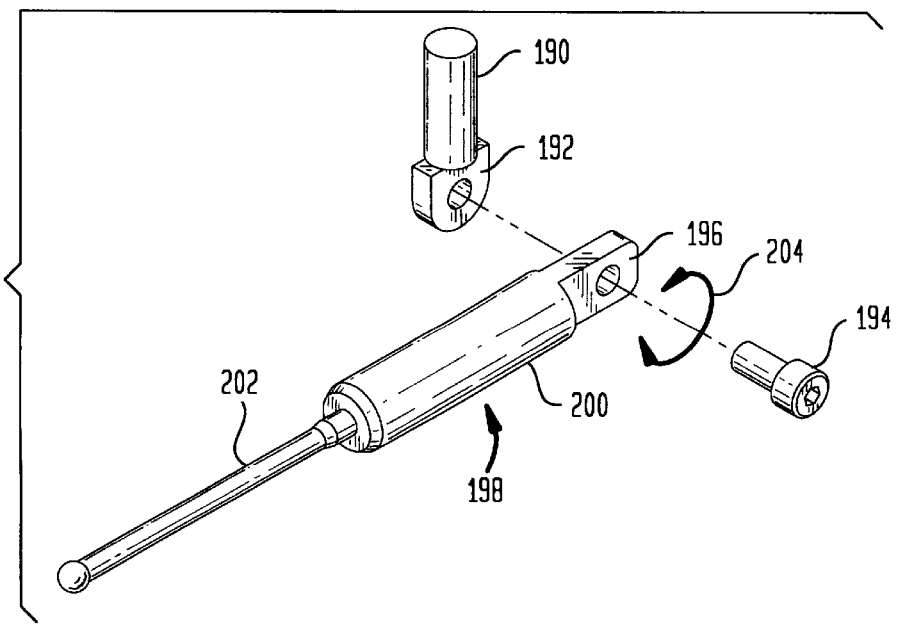
FIG. 5 is a schematic, perspective view of a rotatably adjustable stylus for use with the probe assembly according to this invention.

FIG. 5 illustrates another embodiment having a probe stem 190, which can be mounted on a multi-probe base with an end bracket 192. End bracket 192 receives a set screw 194 that secures a corresponding mounting bracket 196 of a probe 198. Probe 198 includes a body 200, a movable stylus 202, and a contact (not shown) which may be similar to that described for the embodiment of FIGS. 1, and 12–14. The signals from these probes may be processed as described in FIG. 11. Probe 198 can be pivoted, as shown by arrow 204, relative to end bracket 192 to align probe 198 in desired position. In one embodiment, probe 198 can be disposed parallel to the probing direction with respect to an angled workpiece surface (not shown). It is contemplated that a single pivotable probe also could be provided on a single base on a movable element of a coordinate measuring machine, as shown and described herein.

Figure 6:
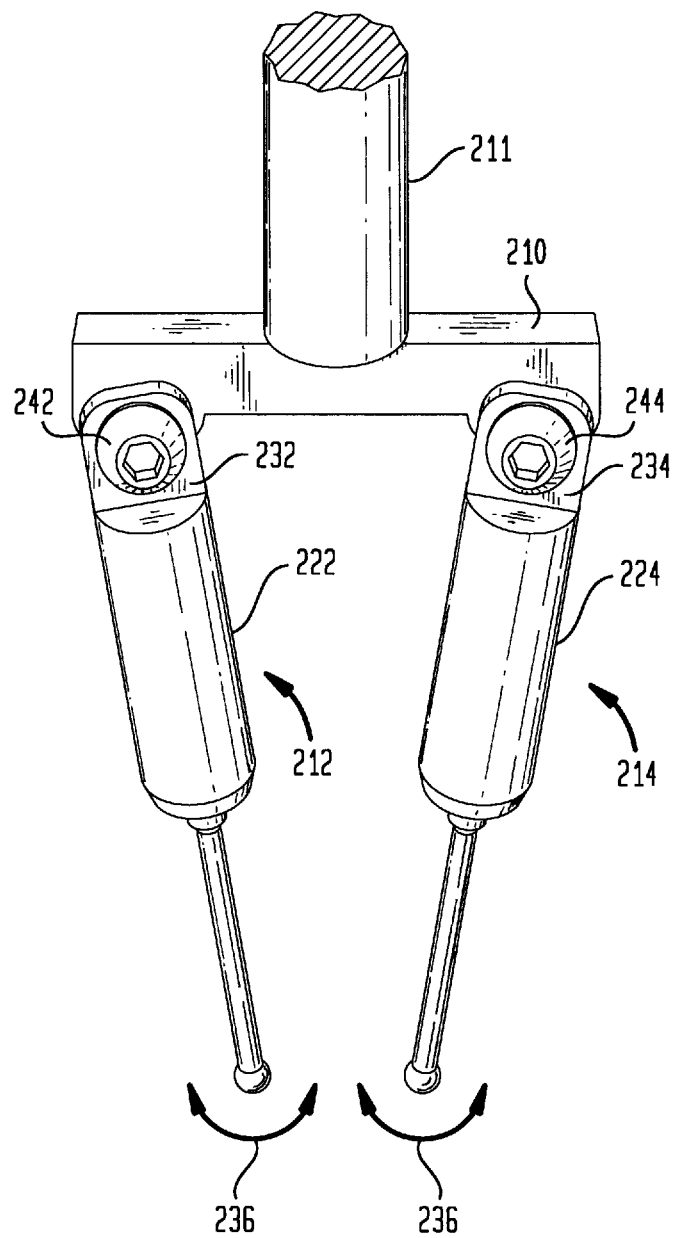
FIG. 6 is a schematic, perspective view of an alternate embodiment for a rotatably adjustable set of styli for use with the probe assembly according to this invention.

FIG. 6 illustrates yet another alternate embodiment in which a probe base 210 having a mounting stem 211 supports a pair of probes 212 and 214. Probes 212 and 214 include respective bodies 222 and 224 similar to body 200 shown and described in FIG. 5, and contacts (not shown) which may be similar to those described with respect to the embodiment of FIGS. 1, and 12–14. The signals from these probes may be processed as described in FIG. 11. Probes 212 and 214 include respective bases 232 and 234 that are pivotable, as shown by curved arrows 236, relative to base 210. Each probe 212, 214 is pivotable within a plane through an angle of approximately 180 degrees. Hence, probes 212 and 214 can be arranged in any alignment, including being opposed to one another or being parallel to one another. In fact, the position of probes 212 and 214 can be adjusted so that the probe tips are spaced apart a distance less than the diameter of the probe bodies 222 and 224. This embodiment enables both probes to be aligned perpendicularly of the probing direction and allows one probe to be set to determine whether the workpiece is within a desired tolerance or deviation from a standard in one direction (i.e., standard plus the tolerance) and the other probe to be set to determine whether a workpiece is within a desired tolerance or deviation from a standard in an opposite direction (i.e., standard minus the tolerance). Probes 212 and 214 are locked in a given pivoted position by set screws 242 and 244, or other known devices.

Figure 7:
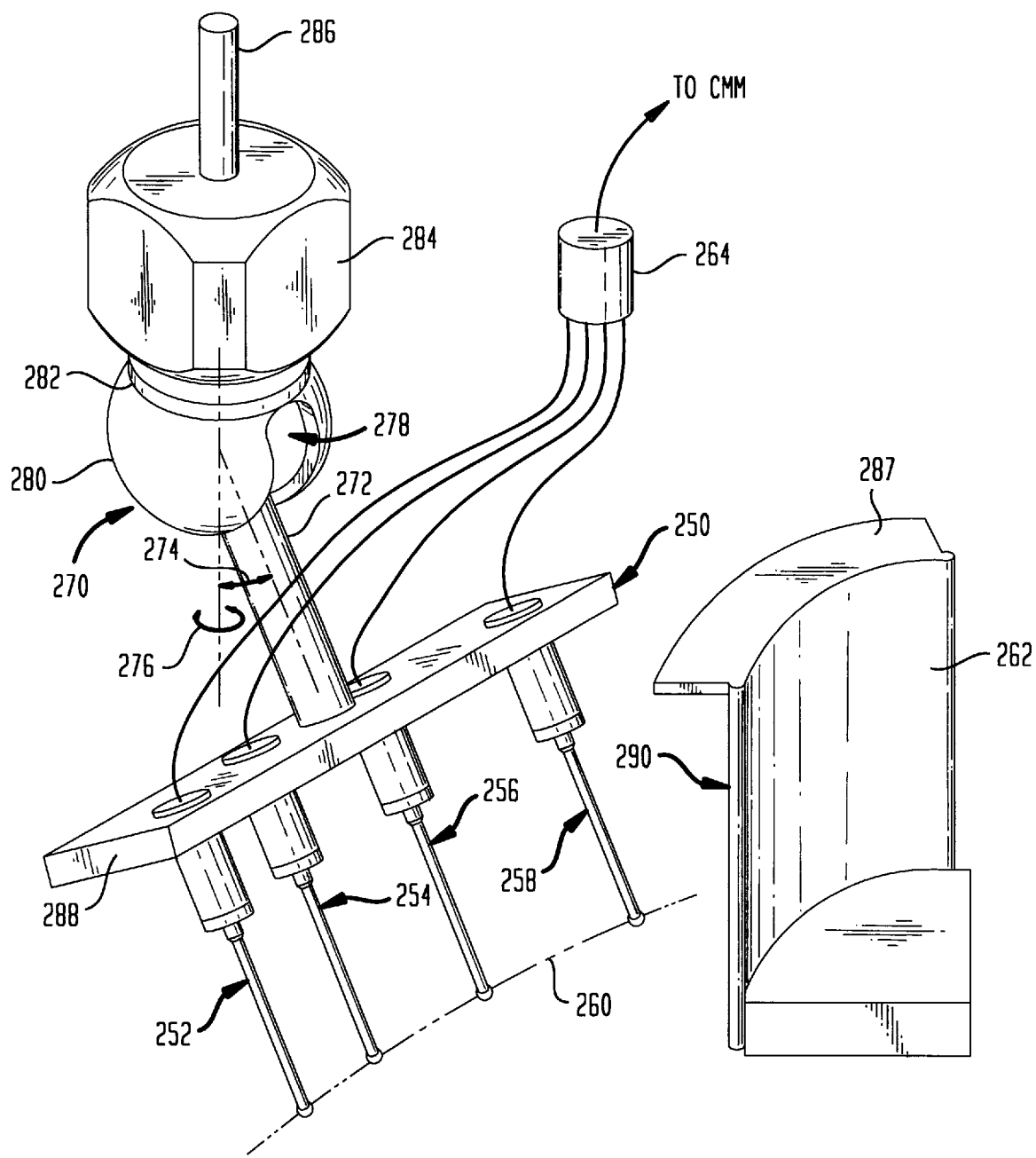
FIG. 7 is a schematic, perspective view of a probe assembly according to this invention interconnected with an articulated wrist assembly.

FIG. 7 illustrates another embodiment comprising a multi-probe assembly 250. Assembly 250 includes probes 252, 254, 256 and 258 arranged along an arc (curved dotted line 260) to conform to the shape of a workpiece 262. Probes 252, 254, 256 and 258 contain contacts (not shown) which may be similar to those described in the embodiment of FIGS. 1, and 12–14, and are connected to an appropriate processing circuit 264, like that of FIG. 11, that is connected to a CMM (not shown). In this arrangement, the relative position of probe assembly 250 may be changed to conform to the orientation of an object relative to the movable elements of the CMM. An articulating wrist assembly 270 supports probe assembly 250 via a pivotable stem 272. Wrist assembly 270 enables probe assembly 250 to pivot with respect to the z-axis through an arc (curved arrow 274) and to swivel about the Z-axis (curved arrow 276). A clearance slot 278 is provided in the ball-end 280 of the wrist 270 of this embodiment. Clearance slot 278 enables stem 272 to swing through arch 274. A bearing surface 282 is also provided in this embodiment to enable ball-end 280 to swivel relative to the wrist base 284. The swivelling and arcuate motions can be accomplished manually or can be powered by appropriate servo or other motors (not shown). Wrist base 284 includes a conventional mounting stem 286 which may be attached to a movable element of a coordinate measuring machine.

The arrangement shown and described in FIG. 7 enables probes to be quickly and easily oriented to reach locations that would otherwise be difficult for a large or bulky probe assembly to reach. For example, the probe base 288 may interfere with the measurement of workpiece 262 such that probes 252, 254, 256 and 258 would be unable to contact surface 290 of workpiece 262. However, by pivoting probe assembly 250 through arc 274, as shown, surface 290 can be contacted by the probes. Additionally, when a more remote surface 292 of the workpiece 262 is measured, the probe assembly 250 may be pivoted in an opposite direction through an arc 274. Probe assembly 250 may also be rotated through an angle 276 about the z-axis to follow the twist of surface 290 of workpiece 262.

Figure 8:
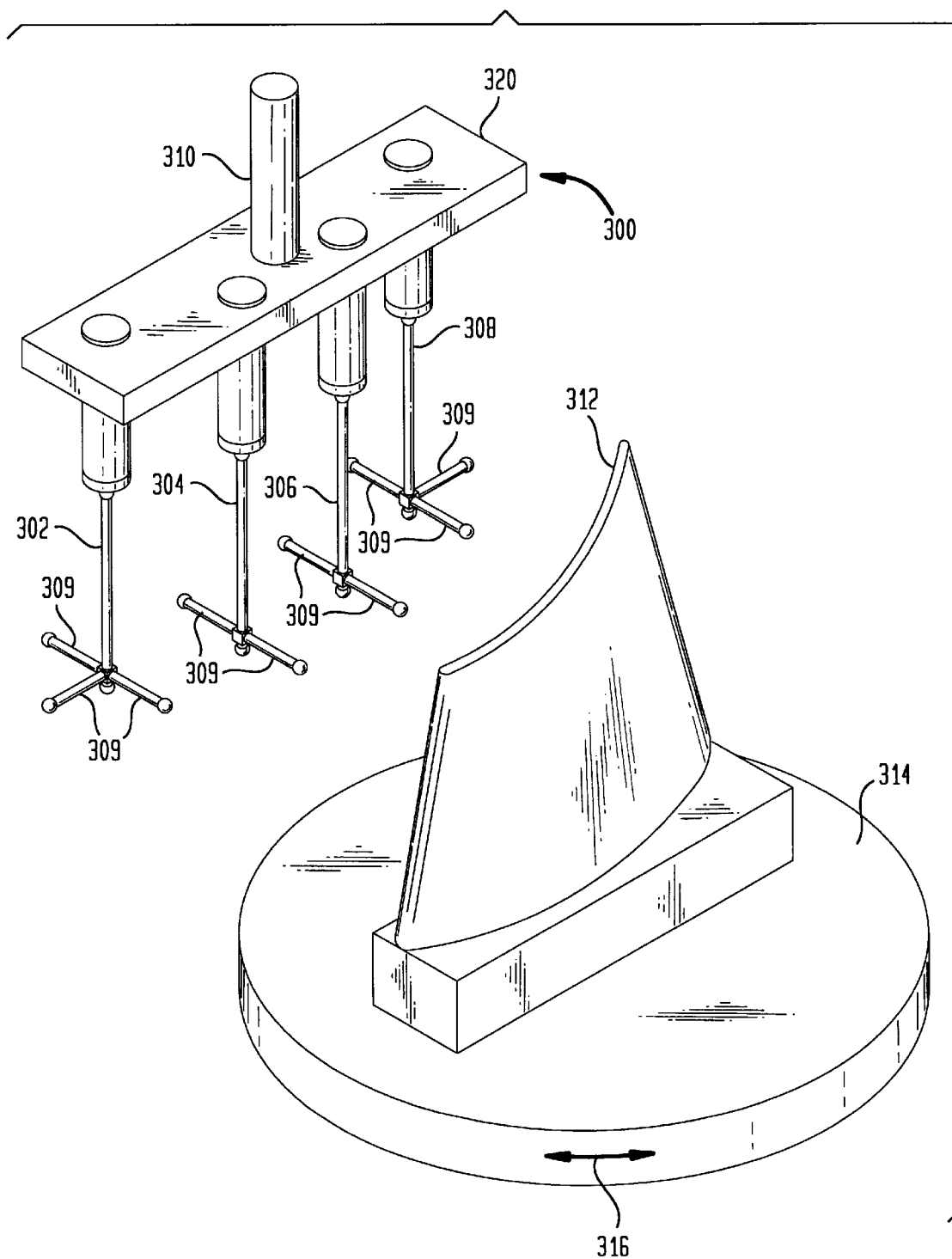
FIG. 8 is a schematic, perspective view of a probe assembly according to this invention in conjunction with a rotary table for holding an object to be measured.

FIG. 8 illustrates yet another embodiment comprising a multi-probe assembly 300 having probes 302, 304, 306 and 308. Probes 302, 304, 306 and 308 typically are multiple-axis probes having multiple styli 309, with contacts which may be like those described in the embodiment of FIGS. 1, and 12–14. The signals from these probes may be processed in the manner described in FIG. 1. The probes are mounted so that they are movable relative to base 320. Assembly 300 is mounted via a stem 310 on an element of a coordinate measuring machine that can be conventional in design and that has three axes of movement. The workpiece 312 in this embodiment is mounted on a turntable 314 that rotates (curved-arrow 316) about a central axis to present different aspects of workpiece 312 to probe assembly 300. The embodiment of FIG. 8 is well-suited to workpieces that require measurements on several sides and/or along multiple cross-sections, such as a workpiece with a twist like workpiece 312. The turntable 314 can be rotated automatically during a programmed measuring cycle or rotated manually to face different aspects of workpiece 312 toward probe assembly 300. In a typical operation employing the embodiment of FIG. 8, the probes 302, 304, 306 and 308 are aligned to conform to the shape of a given portion of workpiece 312, in any manner previously described for other embodiment of this invention. Probe assembly 300 is driven toward workpiece 312. When probes 302, 304, 306 and 308 are triggered by contact with workpiece 312, signals are generated in a manner previously described. These signals are fed to a signal conditioner or processor in which they are translated to meaningful data according to known techniques. Following measurement, probe assembly 300 is withdrawn from workpiece 312. As with other embodiments, the probes and/or the CMM (not shown) may include a known overtravel protection mechanism. Hence, probes 302, 304, 306 and 308 will not be driven beyond a breaking point if assembly 300 is misaligned or if workpiece 312 is not properly shaped.

Once a measurement cycle of workpiece 312 is completed, probe assembly 300 is driven away from workpiece 312 and probes 302, 304, 306, and 308 are, in some applications, reset to take a new measurement. Probe assembly 300 can then be repositioned by the movable CMM element, or by movement of an articulating wrist as described above, or by other means already described. Workpiece 312 also is repositioned by rotating the turntable 314 to place workpiece 312 in the next desired orientation. Another measurement cycle is then undertaken in which the probes are driven toward the object until they are each triggered according to a preprogrammed pattern.

Figure 9:
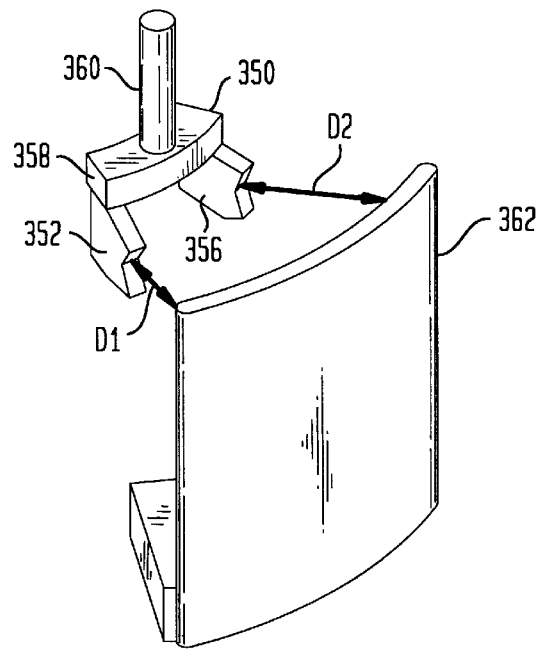
FIG. 9 is a schematic, perspective view of an optical probe assembly having multiple optical sensors for use in measuring an object.

FIG. 9 illustrates a probe assembly 350 having a set of optical probes 352 and 356. Optical probes 352 and 356 are mounted in parallel on a probe base 358 having a conventional stem 360 for mounting on an element of a coordinate measuring machine. According to this embodiment, it is contemplated that a plurality of optical probes would be used which are movable in three axes. As used with reference to the embodiment of FIG. 9, the term "probe" shall include optical or, even, radar-type probes that do not make physical contact with a workpiece. Optical probes 352 and 356 perform measurement readings, based upon distances D1 and D2 to a workpiece 362. Taking measurement cycles according to this embodiment occurs in the same manner as the procedures described above with reference to contacting probes. Optical probes 356 and 358 can be used to scan the workpiece by providing data as the probes move relative to the workpiece. Similarly, such scanning can be undertaken with the contact-type analog probes described herein. An advantage of the probe assembly 350 according to this embodiment is that several measurements can be taken simultaneously to reduce the number of measurement cycles and to increase overall measuring efficiency. Optical probes can be substituted for any of the contacting probes described herein and can be positioned on bases in the same manner and with the same configuration, including, for example, using articulating wrists, variably positionable probe bases and bases holding a large number of probes.

Figure 10:
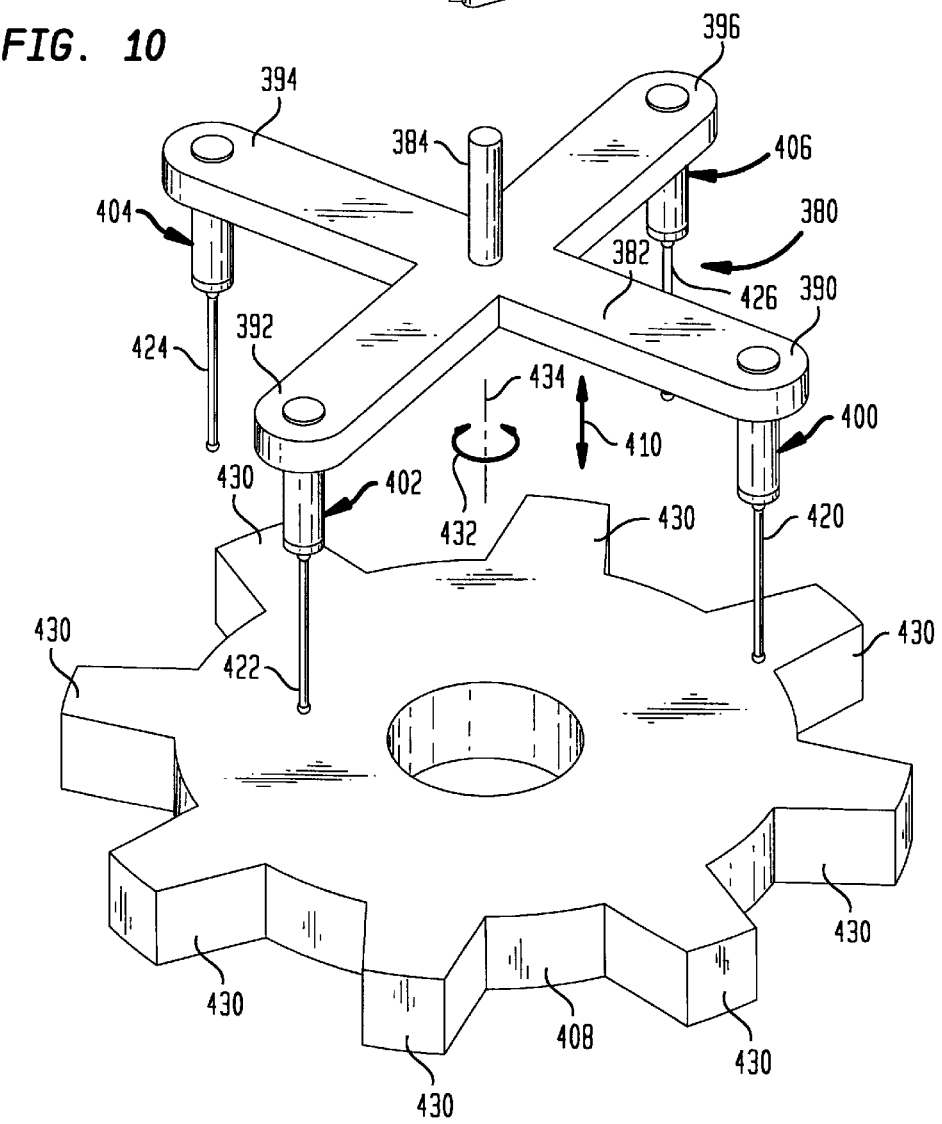
FIG. 10 is a schematic, perspective view of a probe assembly adapted for rotation relative to an object to perform measurements according to an alternate embodiment of this invention.

Another multi-probe assembly 380 is shown and described in FIG. 10. Assembly 380 includes a cruciform key probe base 382 and a centrally located stem 384 of conventional design. Each arm 390, 392, 394 and 396 of base 382 holds, at a distal end, a corresponding probe 400, 402, 404 and 406, each having a contact which may be similar to that described for the probe of FIGS. 1, 12–14. The signals from these probes may be processed as described in FIG. 11. Each of the probes is oriented generally parallel to the others. A variety of base shapes having more or fewer arms than those depicted may be provided, in accordance with this embodiment. In addition, the arms may have differing lengths, rather than the same length, in accordance with this invention. Probe assembly 380 of this embodiment typically approaches a workpiece 408 along the Z-axis, which typically is parallel to the central axis 434 of probe assembly 380. When the styli 420, 422, 424, and 426 are positioned relative to a portion of the workpiece to be measured (in this example gear teeth 430), a measurement is taken. Probe assembly 380 rotates (double arrow 432) about its central axis 434 resulting from rotation of the coordinate measuring machine element on which assembly 380 is mounted. To facilitate rotation, a rotating, articulated wrist as shown and described in FIG. 7 may be attached to stem 384. Rotation of assembly 380 can occur in each of two directions, to measure facing sides of a pair of adjoining teeth 430 in one cycle. Alternatively, workpiece 408 may be rotated about a central axis with respect to assembly 380. To measure an entire workpiece 408, at least two measurement cycles are employed. In each cycle, probe assembly 380 rotates in a clockwise direction and then in a counterclockwise direction as shown in FIG. 10 (or workpiece 408 is rotated in counterclockwise direction and then in a clockwise direction) measuring facing sides of adjoining teeth 430. After a first set of measurements is performed, probe assembly 380 is extracted from workpiece 408 and rotated so that the styli 420, 422, 424 and 426 engage the facing sides of the next pair of adjoining gear teeth. For a multi-tooth gear, a plurality of cycles can be employed until all gear teeth have been measured. The rotational measurement procedure described herein can be employed with any multi-probe arrangement shown, described or suggested herein.

The foregoing is a detailed description of preferred embodiments of the invention. Various modifications and additions can be made without departing from the spirit and scope of the invention. For example, large rays of probes can be mounted on the complexly shaped bases that are custom designed to fit a certain workpiece shape. The turntables shown herein for rotating workpieces can also include structures that enable movement of workpieces in other dimensions. As noted above, contacting probes that operate on a variety of digital and analog-based signaling systems can be employed. In addition, a variety of non-contacting probes can be utilized according to this invention. Accordingly, this description is meant to be taken only by way of example and not to otherwise limit the scope of the invention.

What is claimed is:

1. A probe assembly for a coordinate measuring machine comprising:
   a probe base member mounted on a moving element of a coordinate measuring machine;
   a plurality of individual sensing probes each generating a discrete sensing signal based upon a position relative to an object to be measured, each of the plurality of probes being mounted on the probe base in spaced-apart relationship so that a plurality of points on a workpiece can be measured during one machine motion cycle; and
   a sensor associated with each of said probes capable of generating a sensing signal based upon a position relative to the object to be measured when the object to be measured is approached from multiple directions.

2. The probe assembly as set forth in claim 1, wherein at least some of the plurality of probes comprise touch trigger probes.

3. The probe assembly as set forth in claim 1, wherein the probe base includes mounting positions for each of the plurality of probes and wherein the mounting positions define a path therebetween.

4. The probe assembly as set forth in claim 3, wherein the mounting locations of each of the probes is positioned along a path that approximately defines an outline of a portion of the workpiece to be measured.

5. The probe assembly as set forth in claim 4, wherein at least one of the probes comprises a touch trigger probe.

6. The probe assembly as set forth in claim 4, wherein at least one of the probes comprises a non-contacting probe that measures relative distance from the workpiece to a portion of the noncontacting probe.

7. The probe assembly as set forth in claim 6, wherein said one probe comprises one of an optical, capacitance, inductive and scanning-type probe.

8. The probe assembly as set forth in claim 1, wherein the probe base includes a plurality of portions, each of the portions including a probe mounted thereon.

9. The probe assembly as set forth in claim 8, wherein the probe base includes a stem rotatable about an axis of the stem.

10. The probe assembly as set forth in claim 1, wherein at least one of the probes includes a probe stem and a plurality of styli projecting at angles with respect to one another from an end of the probe stem.

11. The probe assembly as set forth in claim 1, wherein each of the plurality of probes projects from the base in each of a plurality of directions.

12. The probe assembly as set forth in claim 1, wherein the base includes mountings constructed and arranged to enable movement of the probes relative to the base in predetermined directions.

13. The probe assembly as set forth in claim 12, wherein at least one of the probes includes a motor constructed and arranged to move the probe in the predetermined direction to a predetermined location.

14. The probe assembly as set forth in claim 1, wherein the base comprises an elongated member and wherein the plurality of probes comprises at least three probes located at predetermined points along the member.

15. A method for measuring a workpiece with a coordinate measuring machine comprising the steps of:
   moving a probe assembly having a plurality of probes mounted thereon into engagement with a workpiece at a first location;
   generating a signal when each probe contacts the workpiece;
   adapting the signals from all of the probes for use by a controller;
   recording a position of engagement of each of the plurality of probes with the workpiece; and
   withdrawing the plurality of probes from engagement with the workpiece.

16. The method as set forth in claim 15, further comprising the step of conducting a measurement on a known calibration standard prior to the engaging step.

17. The method as set forth in claim 15, wherein said adapting step comprises the step of multiplexing the signals from the probes.

18. The method as set forth in claim 15, further comprising, prior to said moving step, a step of arranging the plurality of probes into a configuration which generally conforms to a shape of a surface on the workpiece to be measured.

19. The method as set forth in claim 15, further comprising the steps of:
   after said withdrawing step, repositioning the workpiece and the plurality of probes with respect to one another;
   moving the probe assembly into engagement with the workpiece at a second location different from the first location;
   generating a signal when each probe contacts the workpiece; and
   recording a position of engagement of each of the plurality of probes with the workpiece.

20. The method as set forth in claim 19, wherein said repositioning step comprises the step of rotating the workpiece with respect to the probe assembly.

21. The method as set forth in claim 19, wherein said repositioning step comprises the step of rotating the probe assembly.

22. The method as set forth in claim 19, wherein said repositioning step comprises the step of pivoting the probe assembly with respect to the coordinate measuring machine.

23. A probe assembly for a coordinate measuring machine comprising:
   a probe base mounted on a moving element of a coordinate measuring machine;
   a plurality of individual sensing probes each generating a discrete sensing signal based upon a position relative to an object to be measured, each of the plurality of probes being mounted on the probe base in spaced-apart relationship such that a plurality of said discrete sensing signals are generated during one machine motion cycle; and
   apparatus for adjusting a position of each probe on said base relative to said base.

24. The probe assembly as set forth in claim 23, further comprising apparatus for adjusting an orientation of each probe with respect to the object to be measured.

25. The probe assembly as set forth in claim 23, further comprising apparatus for adjusting an orientation of each probe with respect to said base.

26. A probe assembly for a coordinate measuring machine comprising:

a probe base mounted on a moving element of a coordinate measuring machine;

a plurality of individual sensing probes each generating a discrete sensing signal based upon a position relative to an object to be measured, each of the plurality of probes being mounted on the probe base in spaced-apart relationship for measurement of a plurality of points on a workpiece during one machine motion cycle, each probe having at least one elongated stylus having a direction of elongation;

apparatus for moving said sensing probes in a direction toward the object to be measured; and a sensor associated with each of said probes for generating said discrete sensing signal, each of said sensors being capable of detecting the object to be measured when the direction toward the object to be measured is a selected one of parallel and non-parallel to the direction of elongation of the stylus on the probe.

* * * * *